United States Patent [19]

Loomis

[11] 4,011,487

[45] Mar. 8, 1977

[54] SOLID STATE COMMUTATOR MOTOR WITH INTERNALLY POWERED ARMATURE

[76] Inventor: Donald D. Loomis, 5402 Gilbert Drive, San Diego, Calif. 92115

[22] Filed: Oct. 7, 1974

[21] Appl. No.: 512,469

[52] U.S. Cl. .............................. 318/138; 318/254
[51] Int. Cl.² ....................................... H02K 29/00
[58] Field of Search .......... 318/138, 254, 171, 189, 318/313, 480; 310/40 R, 46, 3 R

[56] References Cited

UNITED STATES PATENTS

| | | | |
|---|---|---|---|
| 2,731,592 | 1/1956 | Federn | 318/313 X |
| 3,345,547 | 10/1967 | Dunne | 318/254 X |
| 3,569,804 | 3/1971 | Studer | 318/254 X |
| 3,581,173 | 5/1971 | Hood et al. | 318/254 |
| 3,706,924 | 12/1972 | Adler | 318/254 X |
| 3,764,869 | 10/1973 | Woodbury | 318/254 X |
| 3,794,895 | 2/1974 | Coupin et al. | 318/254 |
| 3,896,357 | 7/1975 | Tanikoshi | 318/254 |
| 3,906,320 | 9/1975 | Doemen | 318/254 X |
| R28,358 | 3/1975 | Sommeria | 310/46 X |

*Primary Examiner*—James R. Scott
*Attorney, Agent, or Firm*—Brown & Martin

[57] ABSTRACT

An electric motor incorporating an internally powered DC magnet armature. The motor includes a field winding powered from a DC source but polarity controlled to produce an advancing magnetic field. Power is delivered from a DC source to the field windings by current amplifiers. The amplifier input is controlled by the signals from an optical encoder sensor. The encoder sensor detects the passage of light coded segments on an optical encoder disc rotating with the armature. The relative position of the encoder sensor determines the direction of rotation. The power output of the motor is varied by a variable pulse length generator which converts the pulses from the encoder sensors into a train of pulses of variable length.

8 Claims, 4 Drawing Figures

SOLID STATE COMMUTATOR MOTOR WITH INTERNALLY POWERED ARMATURE

BACKGROUND OF THE INVENTION

Numerous configurations for AC and DC powered electric motors have been developed over the years. It is generally accepted in the field that designs capable of producing relatively high power must incorporate some type of commutator. In the typical case, the commutator is a series of electrical contacts engaged by brushes, the rotation of the electric motor causes a switching of electrical polarity delivered to magnet coils thereby switching magnetic polarity, causing the magnetic field to advance and drawing the armature into continuous rotation. Commutator-less alternating current designs utilizing permanent magnetism for the armature of field have been developed. These designs rely on the inherent polarity switching of alternating current, but are generally considered inefficient, in part due to the use of permanent magnets rather than powered magnetic coils.

Nuclear batteries have been developed which produce substantial quantities of direct current over extended life times. These batteries utilize the spontaneous emission of the beta, of E-negative, particle produced from the decay of radioactive atoms in spontaneous nuclear disintegration. This radioactive decay is utilized to generate an electric current. Despite the availability of such nuclear batteries for many years, no utilization has been made of such batteries in an electric motor designed to take full advantage of the batteries potential.

Accordingly, it is desirable to have an electric motor design which is capable of utilizing the potential of nuclear batteries, to power constant polarity electro-magnets and to thereby produce a highly efficient electric motor. Such development is particularly desirable where the motor incorporates a solid state commutator making available the advantages of long life and ease of control over speed and direction of rotation.

SUMMARY OF THE INVENTION

An exemplary embodiment of the invention incorporates a generally cylindrical rotor housing. The rotor body incorporates a plurality of battery mounting recesses which are symmetrically distributed about the axis of rotation. Also contained within the rotor body are a pluraltiy of rotor electro-magnets. The rotor electro-magnets are symmetrically distributed about the circumference of the rotor body and are evenly spaced from one another. The rotor electro-magnets are wired in a series so that when they are powered from a DC source, as described hereinafter, each of the electro-magnets produces a constant polarity electro-magnetic field of the same polarity orientation.

A stator housing is provided with supports a number of stator electro-magnets equal to and distributed as the rotor electro magnets. The stator electro-magnets are arranged so that the poles of the rotor electro-magnets pass in close proximity. The stator electro-magnets are wired in series so that the instantaneous polarity of all of the stator electro-magnets is the same at a given instant.

Batteries are received within the battery mounting recesses of the rotor. In the preferred embodiment, the batteries utilized are of the nuclear battery type that generates electrical power from the E-negative emmission produced during radioactive decay. In the exemplary embodiment, the batteries are wired in series and connected to supply power to the series configuration of rotor electro-magnets. The total current flow is determined by the steady state impedance of the series connected rotor magnets together with the sum of the internal resistance of the batteries. Since the nuclear batteries may have a half-life in excess of 3–15 years, that is such batteries will continue to produce power at a rate at least half of the initial rate for a period of 3–15 years, it is not necessary to provide switching for the rotor batteries. The rotor batteries may be encapsuled and permanently positioned in appropriate cases. Thus, the rotor power configuration is such that it may be utilized in explosive environments of a corrosive chemical environment where conventional motors could not function effectively.

The stator electro-magnets are also powered from a DC source. Such source may be also constituted by a nuclear battery or batteries and such use is preferred with the invention. By incorporating nuclear batteries to power the stator electro-magnets as well as the rotor electro-magnets the device is completely self-contained and may be utilized in remote locations which do not have any other source of power.

The polarity of power from the stator batteries is switched under the control of a pair of optical encoder sensors. These sensors detect the passage of light and dark segments of an optical encoder disc carried on the motor shaft. By properly positioning the encoder sensor with respect to the relative position of the rotor electro-magnets and stator electro-magnets it is possible to cause the polarity of the stator electro-magnets to switch at the half-way point of the rotor electro-magnets between adjacent stator electro-magnets. In this manner, magnetic forces cause the rotor electro-magnet to be pushed away from a first stator electro-magnet and then to be drawn toward a second stator electro-magnet. A variable pulse length generator chops the full length pulses from the optical encoder to create partial length pulses in operating conditions that require less than the full power output of the electric motor. The pulses are amplified by current amplifiers which deliver current to the series configured stator electro-magnets.

It is therefore an object of the invention to provide a new and improved solid state commutator motor with an internally powered armature.

It is another object of the invention to provide a new and improved solid state commutator motor with variable power output.

It is another object of the invention to provide a new and improved solid state commutator motor which is fully reversible.

It is another object of the invention to provide a new and improved solid state commutator motor wich is highly efficient.

It is another object of the invention to provide a new and improved solid state commutator motors with reduced need for repair.

It is another object of the invention to provide a new and improved solid state commutator motor which may be manufactured in a large range of sizes.

It is another object of the invention to provide a new and improved solid state commutator motor with a low operating and maintenance cost.

Other objects and many attendent advantages of the invention will become more apparent upon a reading of FIG. 1 is a side elevation view of the motor, partially cut away.

Figure 1:
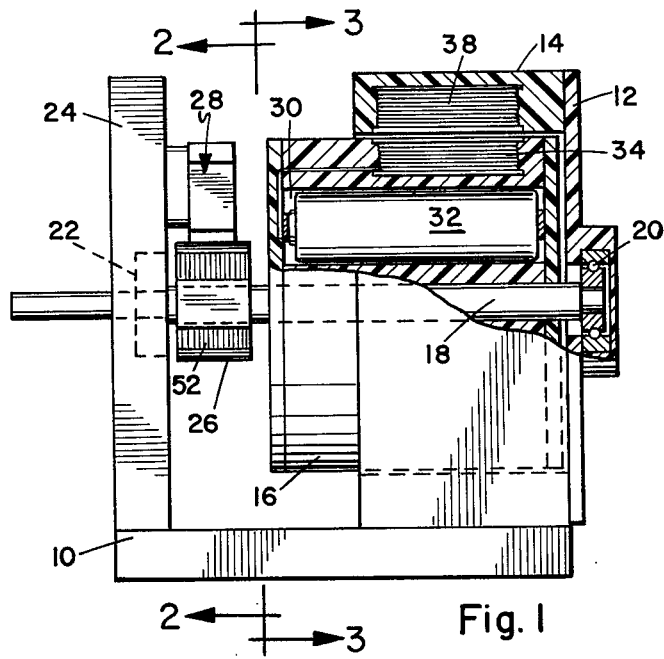
Figure 2:
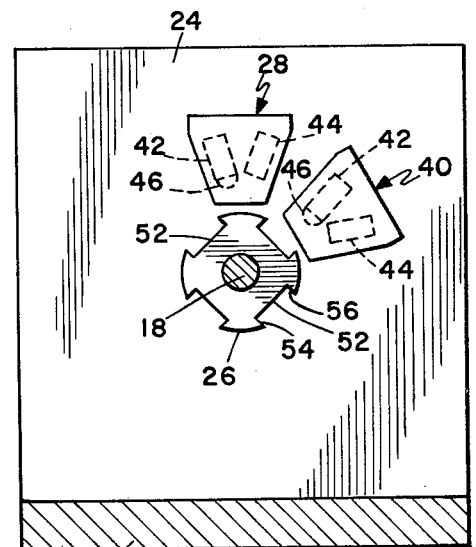
FIG. 2 is a sectional view taken on line 2—2 of FIG. 1.
Figure 3:
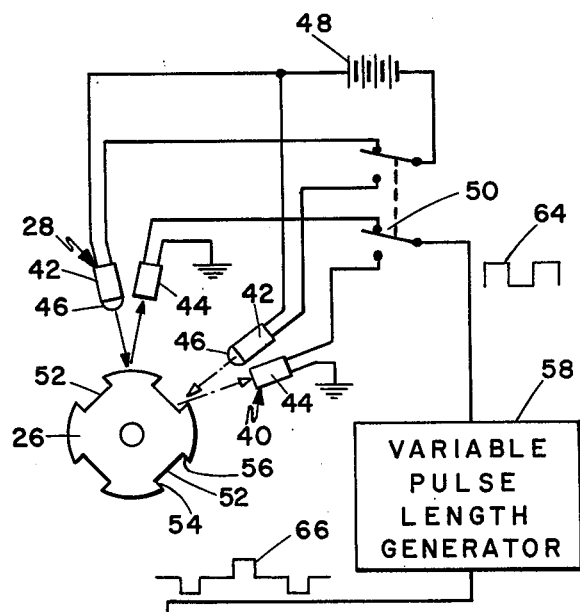
FIG. 3 is a sectional view taken on line 3—3 of FIG. 1 and partially cut away.
Figure 3:
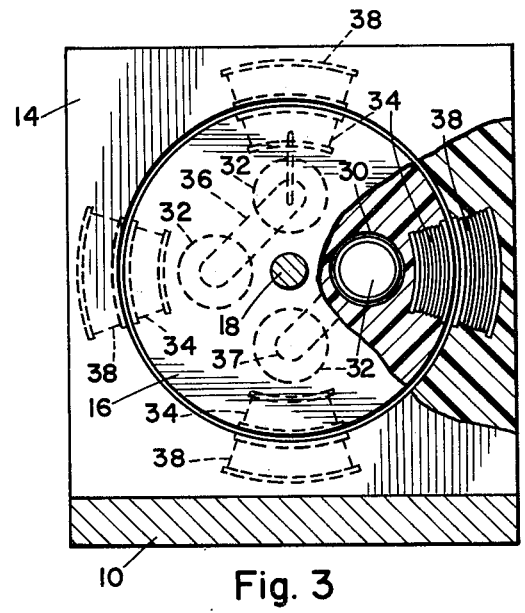

Referring now to FIGS. 1 through 3 of the drawing, there is illustrated a base 10 which carries at opposite ends a stator frame 12 and an encoder frame 24. The stator housing 14 is carried by the stator frame and includes a cylindrical opening in which the rotor body 16 is received. Rotor 16 is mounted for rotation on a shaft 18 journalled in stator frame bearing 20 and encoder shaft bearing 22. The rotor body 16 includes four battery mounting recesses 30 which extend into the rotor body 16 parallel to the axis of shaft 18 and which receive generally cylindrical rotor batteries 32. The rotor batteries 32 are electrically interconnected in series by series interconnection conductors 36 and 37. Four iron core electro-magnets 34 are received in the rotor body 16 and faired into the outer circumference thereof. The coils 34 rotate under and in direct proximity to the stator electro-magentic coils 38 received in the stator housing 14. An optical encoder disc 26 is received on shaft 18 between the rotor body 16 and its encoder frame 24. Encoder sensors such as in encoder sensor 28 are received on the encoder frame and positioned in close proximity to the optical encoder disc.

Figure 4:
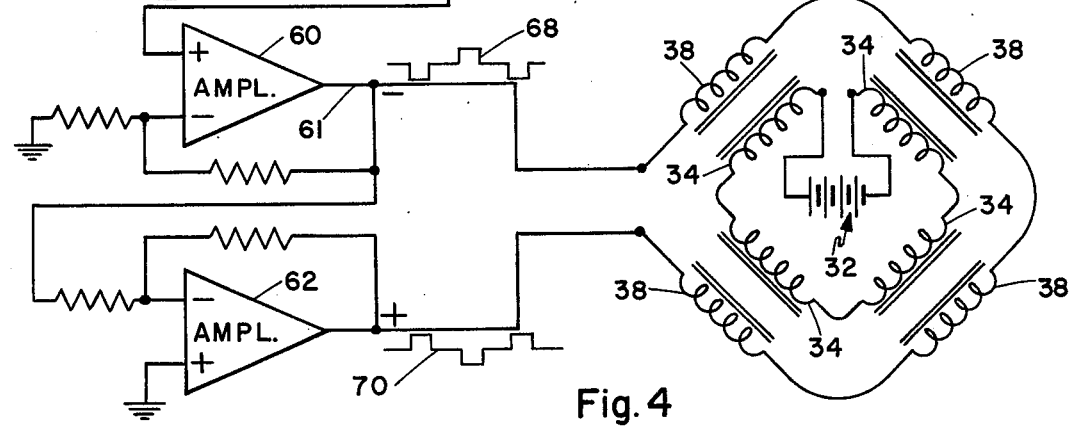
FIG. 4 is a wiring diagram of the motor.

Referring to FIG. 4, the use of two optical encoder sensors 28 and 40 is illustrated. In this configuration, the optical encoder 28 is utilized to generate signals for forward rotation and the encoder sensor 40 is utilized to generate signals during reverse rotation. Each encoder sensor incorporates a light emitting diode section 42 which illuminates the optical encoder disc 26 through a lens 46. Reflected light from the light emitting diode 42 is received by a photo transistor 44. A forward reverse switch 50 determines which of the encoder sensors 28 or 40 will be powered from battery 48, and selects the output of the appropriate sensor 28 or 40 to be delivered to the variable pulse length generator 58.

The optical encoder disc 26 is configured with a polarity of segments. Alternate segments comprise slots 52 which slots are cut into the surface of the disc 26 to produce flat bottomed slots with generally vertical sides 54 and 56. The bottom of the slot 52 is painted or otherwise coated with black coloration. Accordingly, the amount of light that is received by the photo transistor 44 is dependent upon the rotational position of the optical encoder disc 26. Because of the sharp divergence from the circumference of the disc 26 to the vertical sides 54, the resultant signal from the photo transistor 44 is substantially a square wave as illustrated at 64.

The variable pulse length generator 58 comprises any of various suitable configurations whereby the completed square wave 64 is reduced an appropriate amount to produce a partial alternating positive and negative pulse such as is illustrated at 66. The effect of the reduction of pulse length is to reduce the power output of the device as will be more understood hereinafter. The output of the variable pulse length generator 58 is delivered to a primary current amplifier 60, and from the primary current amplifiers negative output 61, to an inverting current amplifier 62. The output of amplifier 60 corresponds generally to the square wave form 66 but is amplified in magnitude. This wave form is illustrated at 68.

The output of inverting current amplifier 62 corresponds to the wave form at 68 except that the wave form is inverted such as it is illustrated at 70. Thus the combined effect of amplifiers 60 and 62 is to double the amount of power which can be delivered to the stator windings 38.

OPERATION

In use, batteries 32 are inserted into the battery mounting recesses 30 in rotor body 16. In appropriate instances, the batteries may be encapsulated into position to prevent contamination. For such an application, nuclear batteries with their extremely long service life would be employed. Rotor batteries 32 are wired in series and deliver their electrical output to the rotor coils 34 which are also connected in a series loop. Thus the coils 34 each produce a magnetic field of fixed polarity. With the forward switch 50 in position illustrated, the primary optical encoder sensor 28 will be enabled and will cause the commencement of rotation in a first or primary direction. As the shaft 18 rotates, the optical encoder disc 26 is rotated in the field of view of the encoder sensor 28 causing a square wave signal to be generated. The square wave signal controls the delivering of a pulse to the stator electro-magnets and the polarity of that pulse. As the rotor electro-magnets are repelled from the stator electro-magnets and reach a position one half way between adjacent stator electro-magnets, the polarity of the pulse from the optical encoder disc is inverted, causing the rotor to be then drawn toward the next stator electro-magnet. In this fashion, a rotating electric field is created which is covered by the rotational position of the shaft 18. The amount of power delivered by the motor is governed by the setting of the variable pulse length generator 58. Thus for the wave form output 66 illustrated less than half of the total available power is being commanded from the primary and inverted amplifier 60 and 62. For reverse rotation the forward-reverse switch 50 is operated to the position opposite of that shown in FIG. 4 which enables the optical encoder sensor 40. Encoder sensor 40 produces the same polarity reversal as was described in association with encoder sensor 28 but is rotationally oriented to produce rotation in the opposite direction. It is within the scope of the invention to use a single optical encoder sensor mounted for movement between the positions illustrated. Such a configuration eliminates the need for a forward reverse switch 50.

Having described my invention, I now claim:
1. An electric motor comprising:
    a rotor body mounted for rotation on a shaft,
    at least one armature electro-magnet carried by said rotor body,
    at least one DC battery mounted within said rotor body and connected to power said armature electro-magnet to produce a fixed magnetic pole for each of said armature electro-magnets,
    at least one field electro-magnet mounted in juxtaposition to the circular path of said armature electro-magnet,
    a source of DC power for said electro-magnet, an encoding disc on said shaft, said encoding disc having a number of encoding segments equal to twice the number of said armature electro-magnets, sensor means in association with said encoding disc for detecting the passage of alternate segments of said disc and producing a signal output corresponding to a detection of said alternate segments, said sensor means comprising a first sensor for detecting the passage of alternate segments of said encoding disc and mounted to fixed structure at a first position with respect to said encoding disc, a second sensor for detecting the passage of alternate segments of said disc mounted to fixed structure at a second position rotationally displaced around said encoding disc with respect to said first position, amplifier means connected between said sensor means and said field electro-magnet for increasing the power of pulses corresponding to signals produced by said sensor means in detecting said segments, a forward-reverse switch for selectively connecting said first sensor or said second sensor to said power delivery means.

2. A motor according to claim 1 further including:
a variable pulse length generator connected between said encoding sensor means and said amplifier means.

3. A motor according to claim 2 wherein:
said amplifier comprises a primary current amplifier and inverting current amplifier,
said inverter current amplifier delivering amplified pulses corresponding to pulses from said variable pulse length generator but having an inverted polarity.

4. An electric motor according to claim 1, comprising:
said DC battery cell comprising at least one cell generating electrical energy from the spontaneous emission of E-negative particles in the decay of radioactive atoms.

5. An electric motor according to claim 1, wherein,
said rotor body includes a plurality of cylindrical recesses mounted on axes parallel to the axis of rotation of said rotor body,
a plurality of DC batteries mounted with said battery mounting recesses.

6. A electric motor according to claim 1, wherein,
said sensor means comprises an optical encoder sensor including a light emitting diode and a phototransistor.

7. An electric motor according to claim 6, wherein,
said encoding disc comprises an optical encoder disc with a plurality of straight sided slots cut into circumference of the disc.

8. The motor according to claim 7, wherein,
said slots are coded with a black coloration.

* * * * *